(12) United States Patent
Ziegelmiller

(10) Patent No.: US 6,604,074 B2
(45) Date of Patent: Aug. 5, 2003

(54) AUTOMATIC VALIDATION OF RECOGNIZED DYNAMIC AUDIO DATA FROM DATA PROVIDER SYSTEM USING AN INDEPENDENT DATA SOURCE

(75) Inventor: Daniel Ziegelmiller, Harvard, MA (US)

(73) Assignee: Empirix Inc., Waltham, MA (US)

( * ) Notice: Subject to any disclaimer, the term of this patent is extended or adjusted under 35 U.S.C. 154(b) by 0 days.

(21) Appl. No.: 09/814,576

(22) Filed: Mar. 22, 2001

(65) Prior Publication Data

US 2002/0138261 A1 Sep. 26, 2002

(51) Int. Cl.[7] ............................................... G10L 15/26
(52) U.S. Cl. ....................................... 704/235; 704/270
(58) Field of Search ................................. 704/235, 270

(56) References Cited

U.S. PATENT DOCUMENTS

| | | | | |
|---|---|---|---|---|
| 5,168,548 A | * | 12/1992 | Kaufman et al. | 704/200 |
| 5,231,670 A | * | 7/1993 | Goldhor et al. | 704/275 |
| 6,108,632 A | * | 8/2000 | Reeder et al. | 704/275 |
| 6,125,347 A | * | 9/2000 | Cote et al. | 704/275 |
| 6,246,981 B1 | * | 6/2001 | Papineni et al. | 704/235 |
| 6,332,120 B1 | * | 12/2001 | Warren | 704/235 |

\* cited by examiner

Primary Examiner—Talivaldis Ivars Smits
(74) Attorney, Agent, or Firm—Daly, Crowley & Mofford, LLP

(57) ABSTRACT

The present invention provides a method to automate the validation of dynamic data presented over telecommunications paths. The invention utilizes continuous speaker-independent speech recognition together with a process known generally as natural language recognition to reduce dynamic utterances to machine encoded text without requiring a prior training phase. Further, when configured by the end user to do so, the test system will convert common examples of dynamic speech, such as numbers, dates, times, and currency utterances into their usual textual representation. This eliminates the limitation that all tested utterances need to be known by the test system in advance of the test. By converting the dynamic utterances to machine encoded text, the invention facilitates automated validation of the data so converted, by allowing its use as input into an automated system which can indepent source of the dynamic data and access an validate the data.

16 Claims, 1 Drawing Sheet

AUTOMATIC VALIDATION OF RECOGNIZED DYNAMIC AUDIO DATA FROM DATA PROVIDER SYSTEM USING AN INDEPENDENT DATA SOURCE

BACKGROUND OF THE INVENTION

Automated data provider systems are used to provide data such as stock quotes and bank balances to users over phone lines. The information provided by these automated systems typically comprises two parts. The first part of the information is known as static data. This can be, for example, a standard greeting or prompt, which may be the same for a number of users. The second part of the information is known as dynamic data. The name of the company and the current stock price are dynamic data in the real world, because they change continuously as the users of the automated data provider systems make their selections and prices fluctuate.

The automated data provider systems need to be tested at two levels. One level of testing is to test the static data provided by the automated data provider. This can be accomplished by, for example, testing the voice prompts that guide the user through the menus, ensuring that the correct prompts are presented in the correct order. A second level of testing is to test that the dynamic data reported to the user is correct, for example, that the reported stock price is actually the price for the named company at the time reported.

In existing test systems used to test automated data provider systems, the speech data must be presented to the test system in a training phase prior to the testing phase, which prepares the system to recognize the same speech utterances when presented during the testing phase. The recognition scheme is generally known as discrete speaker dependent speech recognition. Thus, the system is limited to testing speech utterances presented to it a priori, and it is impractical to recognize dynamically changing utterances except where the set of all possible utterances is small.

One system that utilizes speech recognition as part of its provision of testing is the HAMMER IT™ test system available from Empirix Inc. of Wilmington, Mass. The HAMMER IT test system recognizes the responses from the system under test and verifies that the received responses are the responses expected from the system under test. This test system works extremely well for recognizing static responses and for recognizing a limited number of dynamic responses which are known by the test system, however the HAMMER IT currently cannot test for a wide variety of dynamic responses which are unknown by the test system.

Another test system is available from Interactive Quality Systems (IQS) of Hopkins, Minn., utilizes an alternative recognition scheme, namely, length of utterance, but is still limited to recognizing utterances presented to it a priori. It would seem difficult for this system to recognize typical dynamic data, such as numbers, since the utterance "one two three" would often have the same duration as the utterance "two one three", "three two one" and so on, particularly if the utterances were generated by an automated system.

A possible alternative would be a semi-automated system, in which the dynamic portion of the utterance would be recorded and presented to a human operator for encoding. The dynamic portion of the utterance would be recorded and presented to a human operator for encoding in machine-readable characters.

It would be desirable to have a test system that tests the responses of automated data provider systems which presents both static data and dynamic data. It would be further desirable to have a test system which does not need to know beforehand the possible dynamic data.

SUMMARY OF THE INVENTION

With the foregoing background in mind, it is an object of the present invention to provide a method to automate the validation of dynamic data presented over telecommunications paths. The invention utilizes continuous speaker-independent speech recognition together with a process known generally as natural language recognition to reduce dynamic utterances to machine encoded text without requiring a prior training phase. Further, when configured by the end user to do so, the test system will convert common examples of dynamic speech, such as numbers, dates, times, and currency utterances into their usual textual representation. For instance, it will convert the utterance "four hundred fifty four dollars and twenty nine cents" into the more usual representation of "454.29". This will eliminate the limitation that all tested utterances need to be known by the test system in advance of the test.

By converting the dynamic utterances to machine encoded text, the invention facilitates automated validation of the data so converted, by allowing its use as input into an automated system which can independently access and validate the data.

BRIEF DESCRIPTION OF THE DRAWINGS

The invention will be better understood by reference to the following more detailed description and accompanying drawings in which.

DETAILED DESCRIPTION

Figure 1:
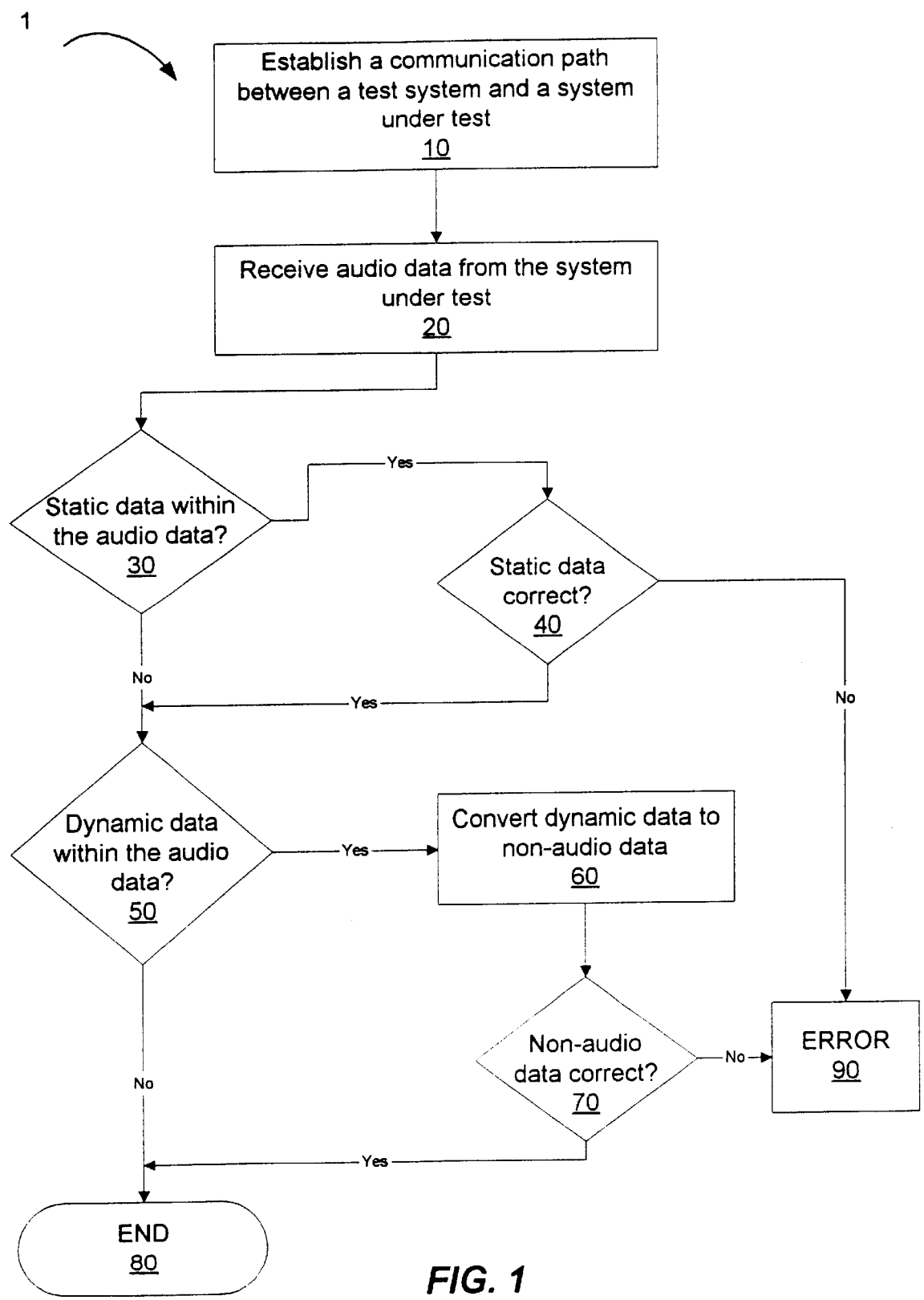
FIG. 1 is a flow chart of the presently disclosed method.

To perform testing of an automated data provider system requires the ability of the automated system performing the test is to provide two functions. One function is the testing of static data received from the system under test. The audio data is received and processed and speech recognition is performed. The static portion of the utterance is validated against the expectations for the current state of the system under test. A second function of the test system is to provide a conversion from the verbal report of the data (dynamic data) by the system under test into a textual representation. The textual representation, in the form of machine encoded characters, can then be used as input into an automated system which can independently access the data in question and validate it in the appropriate manner, for example, in the case of a stock quotation, by accessing the stock exchange data base.

One advantage of the present invention is that it directly reduces arbitrary dynamic utterances presented over telecommunications devices, such as dollar amounts, times, account numbers, and so on, into machine encoded character representations suitable for input into an automated independent validation system, without intermediate human intervention. The present method eliminates the limitation imposed on known test systems that all possible tested utterances are known in advance of the test.

In the presently disclosed invention, the result of the testing of data from an automated data provider system will be one or more of the following three results. First, a text string of the recognized words, for example, "Enter|pin|number|". Second, natural language "understanding" of the speech clip, so that, for example, "five hundred twelve dollars and thirty five cents" would be recognized as $512.35. Third a tag, which is a user defined name for a recognized utterance.

In addition, the presently disclosed system is able to perform speaker independent recognition, so that creating the vocabulary would not be necessary, except for special words.

Referring now to FIG. 1, a flowchart of the present method 1 is shown. The first step 10 is to establish a communications path between the test system and the system under test. This communications path may be a telephone connection, a wireless or cellular connection, a network or Internet connection or other types of connections as would be known by someone of reasonable skill in the art.

Step 20 comprises receiving audio data from the system under test by the test system through the communication path established in step 10. This audio data may include static data, dynamic data or a combination of static and dynamic data. As an example, the list below contains the possible instances of audio data to be received from the system under test.

"This is the MegaMaximum bank"

"If you need assistance at any time, just say Help"

"Please enter or say your account number"

"Please enter or say your pin number"

"Your current balance is <dollars>"

"We're sorry, your account number or pin were not recognized. Please try again."

"An associate will be with you shortly."

Once the audio data is received, at step 30 a determination is made as to whether the audio data contains static data. In the case where the audio data comprises "This is the MegaMaximum bank", the entire data is static data. In the case wherein the audio data received is "Your current balance is <dollars>" a combination of static data ("Your current balance is") and dynamic data ("<dollars>") has been received.

At step 40, a determination is made as to whether the static data is correct. If the static data corresponds to the expected data, then step 50 is executed. If the static data is incorrect, then an error condition is indicated as shown in step 90.

Following step 30 if no static data has been received, or step 40 if the static data received is correct, step 50 is executed. At step 50 a determination is made as to whether the received audio data contains dynamic data. If no dynamic data has been received, then step 80 is executed, and the process ends. If dynamic data has been received as part of the received audio data, then step 60 is executed.

Step 60 converts the dynamic data to non-audio data. This can be, for example, a textual format such as machine encoded text. Other formats could also be used. Following step 60, step 70 is executed.

Step 70 determines whether the non-audio data is correct. The non-audio data could be a stock price, a dollar amount, or the like. This non-audio data typically is compared to a database which contains the correct data. If the non-audio data was correct, then step 80 is executed and the process ends. If the non-audio data was not correct then step 90 is executed wherein an error condition is reported.

Referring back to the phrase "Your current balance is <dollars>" which contains the dynamic data, the user would construct a grammar to inform the recognizer of the expected utterances and their interpretation, so that, for example, the "<dollars>" slot would be interpreted as a monetary amount ("512.00") rather than a string of words ("five|hundred|twelve|dollars|and|zero|cents|"). The grammar could also assign tags (names) to each utterance, which the recognizer would return along with the text and/or interpretation. For the simpler applications, this would provide a solution conceptually similar to how prompt recognition is typically preformed. The grammar would correspond to the vocabulary, and the tag would be a symbolic version of the clip number received as a recognition result.

Grammars are constructed as text files, with a GUI (Graphical User Interface) interface to ease the user through the arcane syntax. A pseudo-grammar might look as follows:

<phrase1>=(this is the megamaximum bank) {greeting}
<phrase2>=(if you need assistance just say help) {help_prompt}
<phrase3>=(please enter or say your account number) {account}
<phrase4>=(please enter or say your pin number) {pin}
<dollars>=[NUMBER]
<phrase5>=(your current balance is <dollars>{amount}) {balance}

In the above, the elements inside the curly braces ("greeting", "help_prompt", "amount", etc.) are the tags which would be returned if their corresponding phrase were recognized.

When running the script, as each prompt is presented by the system under test, the prompt is sent off to be recognized, and a string, tag, and understanding, if any, are returned as the result. The script compares the returned string against the expected string, or simply checks the tag to see if it is the expected one. For phrase number five above, the script compares only the first four words (static data), and compares the dollar amount (dynamic data) to the expected value as a separate operation.

To implement this, the following would be required. A utility to enroll "MegaMaximum" into the speech recognizer's vocabulary. A utility to set up a grammar. A command to connect the running script with the created grammar. A command to compare strings and substrings on a word by word basis (rather than the character basis of most string utilities). A command to retrieve the "next slot" from the returned result, such as the <dollars> item from phrase number five. A command to detect speech and "barge in" with the request for help. A command to send the utterance to the new recognizer and obtain the result structure. In a particular embodiment the result structure would nominally include the status (recognized, failed), the tag (name) of the utterance, a probability score (0–100, with 100=best), and the text rendition of the utterance. If language understanding were performed, such as the translation of numeral names into currency, the recognized sub-portions would be included in the result structure as well.

For added value, the system could institute a mode to automatically collect the speech clips and translate them into the format of a grammar (a specialized dictation function). This would be useful for setting up tests on undocumented IVR systems to get the test up and running faster.

As described above, the presently disclosed invention performs recognition on larger and more varied utterances than currently available systems. The present invention also handles noise better than currently available systems. The present invention also scales to a larger number of channels (via a separate recognition server). Further, the presently disclosed invention handles dynamic prompts seamlessly with static ones.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method of performing speech recognition comprising the steps of:
   receiving, with a test system, dynamic data from a system under test;
   converting with said test system including a speech recognizer said dynamic audio data to non-audio formatted data; comprising a textual representation format and
   automatically verifying with said test system and with an independent source of said dynamic data that said non-audio formatted data is correct.

2. The method of claim 1 wherein said step of receiving comprises receiving through a telecommunications link.

3. The method of claim 2 wherein said telecommunication link is selected from the group consisting of a telephone line, a cellular telephone link, a network link and an Internet link.

4. The method of claim 1 wherein said dynamic data is selected from the group consisting of names, numbers, dates, times, and currency values.

5. The method of claim 1 wherein said textual representation comprises machine encoded text.

6. The method of claim 1 wherein said step of verifying with said test system that said non-audio formatted data is correct further comprises the step of returning a tag, said tag indicating that said non-audio formatted data was recognized.

7. The method of claim 1 wherein said step of converting with said test system said dynamic data includes the step of performing speaker independent recognition.

8. The method of claim 1 wherein said step of converting with said test system said dynamic data includes the step of performing natural language recognition.

9. A method of performing speech recognition comprising the steps of:
   receiving, with a test system, including a speech recognizer audio data from a system under test, said audio data containing static data and dynamic data;
   verifying with said test system that said static data is correct;
   converting with said test system said dynamic data to non-audio formatted data; comprising a textual representation format and
   automatically verifying with said test system and with an independent source of said dynamic data that said non-audio formatted data is correct.

10. The method claim 9 wherein said step of receiving comprises receiving through a telecommunications link.

11. The method of claim 10 wherein said telecommunication link is selected from the group consisting of a telephone line, a cellular telephone link, a network link, and an Internet link.

12. The method in claim 9 wherein said dynamic data is selected from the group consisting of names, numbers, dates, times, and currency values.

13. The method of claim 9 wherein said textual representation comprises machine encoded text.

14. The method of claim 9 wherein said step of verifying with said test system that said non-audio formatted data is correct further comprises the step of returning a tag, said tag indicating that said non-audio formatted data was recognized.

15. The method of claim 9 wherein said step of converting with said test system said dynamic data includes the step of performing speaker independent recognition.

16. The method of claim 9 wherein said step of converting with said test system said dynamic data includes the step of performing natural language recognition.

* * * * *